(12) United States Patent
Bhagavan et al.

(10) Patent No.: US 9,740,748 B2
(45) Date of Patent: Aug. 22, 2017

(54) SIMILARITY AND RANKING OF DATABASES BASED ON DATABASE METADATA

(71) Applicant: International Business Machines Corporation, Armonk, NY (US)

(72) Inventors: Srini Bhagavan, Overland Park, KS (US); Gerald G. Kiernan, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 652 days.

(21) Appl. No.: 14/219,434

(22) Filed: Mar. 19, 2014

(65) Prior Publication Data

US 2015/0269154 A1    Sep. 24, 2015

(51) Int. Cl.
*G06F 17/30* (2006.01)

(52) U.S. Cl.
CPC .... *G06F 17/3053* (2013.01); *G06F 17/30109* (2013.01); *G06F 17/30598* (2013.01); *G06F 17/30864* (2013.01); *G06F 17/30867* (2013.01)

(58) Field of Classification Search
CPC ......... G06F 17/30598; G06F 17/30864; G06F 17/30867
USPC ....................................................... 707/750
See application file for complete search history.

(56) References Cited

U.S. PATENT DOCUMENTS

| | | | |
|---|---|---|---|
| 5,926,808 A | 7/1999 | Evans et al. | |
| 5,983,216 A | 11/1999 | Kirsch et al. | |
| 6,182,070 B1 * | 1/2001 | Megiddo | G06F 17/30539 707/694 |
| 6,711,569 B1 | 3/2004 | Bushee | |
| 7,401,073 B2 | 7/2008 | Carmel et al. | |
| 7,921,100 B2 | 4/2011 | Hadjieleftheriou et al. | |
| 8,103,661 B2 * | 1/2012 | Patman Maguire | G06F 17/30401 707/722 |
| 8,122,043 B2 | 2/2012 | Buckley et al. | |
| 9,396,187 B2 * | 7/2016 | Chung | G06F 17/30 |
| 2002/0059069 A1 * | 5/2002 | Hsu | G10L 15/18 704/257 |
| 2002/0059191 A1 * | 5/2002 | Tamura | G06F 17/30454 |

(Continued)

OTHER PUBLICATIONS

U.S. Appl. No. 14/538,882, entitled "Similarity and Ranking of Databases Based on Database Metadata", filed Nov. 12, 2014.

(Continued)

*Primary Examiner* — Mark E Hershley
(74) *Attorney, Agent, or Firm* — Daniel R. Simek

(57) ABSTRACT

A processor selects a first database and a second database from a plurality of databases. The processor determines one or more terms found in the first and second database, wherein each term of the one or more terms includes metadata of a database of the plurality of databases. The processor identifies one or more common terms between the first database and the second database and determines the one or more common terms found in each of a plurality of groups of databases of the plurality of databases, wherein each group of databases corresponds to a number of databases which constitute the group of databases. The processor determines a similarity score between the first database and the second database of the plurality of databases based on the one or more common terms found in each group of databases of the plurality of databases.

20 Claims, 5 Drawing Sheets

(56) References Cited

U.S. PATENT DOCUMENTS

| | | | | |
|---|---|---|---|---|
| 2004/0002973 | A1* | 1/2004 | Chaudhuri | G06F 17/3053 |
| 2006/0085399 | A1* | 4/2006 | Carmel | G06F 17/30864 |
| 2007/0185860 | A1 | 8/2007 | Lissack | |
| 2008/0077570 | A1* | 3/2008 | Tang | G06F 17/30684 |
| 2009/0125381 | A1 | 5/2009 | Delepet | |
| 2009/0171945 | A1 | 7/2009 | Li et al. | |
| 2010/0088295 | A1* | 4/2010 | Duan | G06F 17/30253 707/705 |
| 2010/0169361 | A1* | 7/2010 | Chen | G06F 17/30598 707/769 |
| 2011/0218990 | A1 | 9/2011 | Jordahl | |
| 2012/0005218 | A1 | 1/2012 | Rajagopal | |
| 2013/0110828 | A1 | 5/2013 | Meyerzon et al. | |
| 2013/0173632 | A1 | 7/2013 | Birdwell et al. | |
| 2013/0290338 | A1* | 10/2013 | Lee | G06F 17/30731 707/739 |
| 2013/0332454 | A1* | 12/2013 | Stuhec | G06F 17/3053 707/730 |
| 2013/0339343 | A1* | 12/2013 | Hierons | G06F 17/30743 707/722 |
| 2014/0201126 | A1* | 7/2014 | Zadeh | G06K 9/627 706/52 |
| 2014/0214886 | A1* | 7/2014 | Annapragada | G06F 17/30545 707/769 |
| 2015/0169644 | A1* | 6/2015 | Gong | G06F 17/30277 707/769 |

OTHER PUBLICATIONS

Agrawal et al., "DBXplorer: A System for Keyword-Based Search over Relational Databases", Proceedings of the 18th International Conference on Data Engineering (ICDE'02), 1063-6382/02, © 2002 IEEE, <http://ieeexplore.ieee.org/xpls/abs_all.jsp?arnumber=994693&tag=1>.

Chahal et al., "Ranking of Web Documents using Semantic Similarity", 2013 International Conference on Information Systems and Computer Networks, 978-1-4673-5986-3/13, © 2013 IEEE.

Wu et al., "Database Selection for Longer Queries", Copyright is held by author/owner(s), WWW2003, May 20-24, 2003, Budapest, Hungary, ACM xxx.

Yu, Bei et al., "Effective Keyword-based Selection of Relational Databases", SIGMOD '07, Jun. 12-14, 2007, Beijing, China, Copyright 2007, ACM 978-1-59593-686-8/07/0006, <dbgroup.cs.tsinghua.edu.cn/ligl/ . . . /SIGMOD2007-DataSourceSelection.pdf>.

Yu, Clement et al., "Efficient and Effective Metasearch for Text Databases Incorporating Linkages among Documents", ACM SIGMOD May 21-24, 2001, Santa Barbara, California USA, Copyright 2001, ACM 1-58113-332-4/01/05, <cimic.rutgers.edu/~adam/mmis03/MMIS/text_search.pdf>.

Wikipedia, "tf-idf", last modified Oct. 15, 2013, printed Nov. 22, 2013, <http://en.wikipedia.org/wiki/Tf%E2%80%93idf>.

* cited by examiner

US 9,740,748 B2

SIMILARITY AND RANKING OF DATABASES BASED ON DATABASE METADATA

BACKGROUND OF THE INVENTION

The present invention relates generally to the field of managing databases, and more particularly to distinguishing and searching for a database among similar databases.

Offerings for databases may include cloud-based database environments in which users may independently access databases using a virtual image, or alternatively, may subscribe to a database service from a provider. Cloud databases may share a similar structure in which multiple databases are created and deployed from the same database pattern and design, and often share common data and metadata. In some cases, database systems are developed that support multi-tenants to optimize storage and utilization of the multiple databases created from the same database design or database copy. As the number of databases deployed to cloud environments increases, and as the number of tenants using the databases increases, it becomes difficult to distinguish among the databases.

Search criteria techniques based on data content of databases have been used; however, the success of distinguishing between similar databases or searching for specific databases may be heavily dependent on the choice and use of search criteria, and having access to subject matter expertise. For the cases in which users are confronted with multiple, similar databases and need to distinguish between the databases, more effective and efficient techniques are needed.

BRIEF SUMMARY

Embodiments of the present invention disclose a method, computer program product, and system for determining a similarity of databases. A processor selects a first database and a second database from a plurality of databases. The processor determines if one or more terms found in the first database are also found in the second database, wherein each term of the one or more terms includes metadata of a database of the plurality of databases. The processor identifies, in response to determining that one or more terms found in the first database are also found in the second database, one or more common terms between the first database and the second database. The processor determines the one or more common terms found in each of a plurality of groups of databases of the plurality of databases, wherein each group of databases corresponds to a number of databases which constitute the group of databases, and the processor determines a similarity score between the first database and the second database of the plurality of databases based on the one or more common terms found in each group of databases of the plurality of databases.

DETAILED DESCRIPTION

Figure 1:
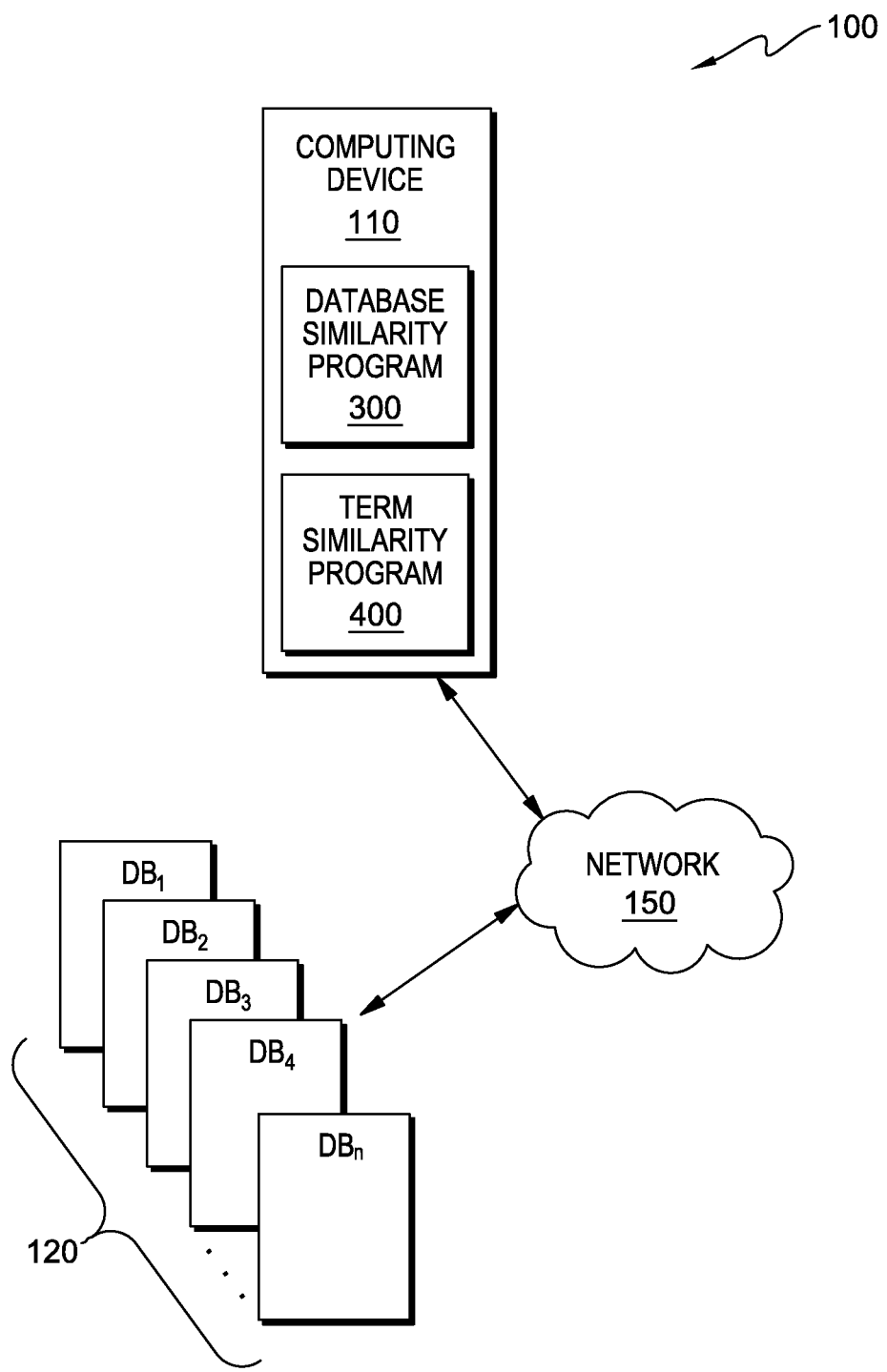
FIG. 1 is a functional block diagram illustrating a distributed database environment, in accordance with an embodiment of the present invention.

Embodiments of the present invention recognize that distinguishing between multiple databases having a similar design and pattern, is increasingly difficult, especially within a cloud computing environment. A similarity score is determined between each database and the other databases of a database environment, and the similarity of a database to the other databases is ranked based on the similarity scores.

Similarity scores are determined by use of modified term frequency—inverse document frequency techniques. Instead of using words as terms, and a corpus of documents in which to search for terms, embodiments of the present invention use metadata of the plurality of databases as terms. In one embodiment of the present invention, terms include a triplet of database metadata which includes: table name, column name, and column type. In other embodiments, other elements of metadata of the plurality of databases may be used as terms, for example, schema names, which include the structure of the database that defines the objects in the database, may be used in the formation of terms.

Instead of searching for terms among a corpus of documents, terms are searched among a plurality of databases within a database environment. A similarity score between a first database and a second database is determined by identifying terms found in both databases, and for each term, determining the number of databases of the plurality of databases, in which each term is found. The number of databases in which a term is found constitutes a group of databases that number from two, in which the term is found only in the first and second databases, to all databases ("n") in the database environment. Embodiments of the present invention may represent the number of terms found in each group of databases as a graph or histogram. A single term found in fewer databases has a higher importance level and thus a higher similarity score than many terms common to more databases.

Similarity scores are used to rank the similarity of each database to the other databases of the plurality of databases. Further, embodiments of the present invention produce a similarity score and rank similarity between a set of search terms and the databases within the plurality of database within a database environment, based on the similarity scores.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 is a functional block diagram illustrating a distributed database environment, generally designated 100, in accordance with one embodiment of the present invention.

FIG. 1 includes computing device 110 which also includes database similarity program 300 and term similarity program 400, network 150, and databases 120. Databases 120 are a plurality of databases that may have been deployed from the same pattern and may include similar or common data and metadata. Databases 120 may include databases that are local and/or remote to computing device 110, and are accessible to computing device 110 via network 150. As use of databases 120 proceeds over time and the number of databases and tenants or users of databases increases over time, embodiments of the present invention recognize that the evolution of each database from other databases within databases 120 becomes difficult for administrators to determine manually.

Network 150 interconnects databases 120 to computing device 110. Database similarity program 300 and term similarity program 400 are depicted as residing on computing device 110. In another embodiment, database similarity program 300 and term similarity program 400 are accessible to computing device 110 via network 150. Network 150 can be, for example, a local area network (LAN), a wide area network (WAN), such as the Internet, or a combination of the two, and can include wired or wireless connections. Network 150 can be a communication fabric within or between computer processors, such as a PCIe bus. In general, network 150 can be any combination of connections and protocols that will support communications via various channels between computing device 110 and databases 120 distributed and various components and devices associated with computing device 110 and databases 120 within distributed database environment 100, in accordance with an embodiment of the present invention.

Computing device 110 may be a laptop computer, tablet computer, netbook computer, personal computer (PC), a desktop computer, a personal digital assistant (PDA), a smart phone, or any programmable electronic device capable of communicating with databases 120 via network 150 and with various components and other devices within distributed database environment 100 (not shown).

Computing device 110 has access to each database within databases 120, and can connect to each database directly or via network 150. Computing device 110 operates database similarity program 300, which determines and ranks the similarity of each database to the other databases in distributed database environment 100. Additionally computing device 110 operates term similarity program 400, which determines and ranks the similarity of databases in distributed database environment 100 to a user-selected set of search terms from a listing of terms of databases 120. Computing device 110 includes internal and external hardware components, as depicted and described in further detail with respect to FIG. 5.

Database similarity program 300 is accessible to and operated by computing device 110. Database similarity program 300 identifies "terms" found within a first database and a second database of databases 120 and determines the number of databases in which each of the terms are found within databases 120. Database similarity program 300 may represent the number of terms found in each group of databases as a graph or histogram, depicting the number of terms found in each group of databases, and the database groupings ranging from two databases to all the databases in the database environment. For example, the x-axis of a histogram for databases 120, which has "n" databases, has "buckets" for terms that includes: a bucket for the number of terms found only in two databases, a bucket for the number of terms found in only 3 databases, a bucket for the number of terms found in only 4 databases, . . . , and a bucket for the number of terms found in "n" databases. The y-axis of the histogram indicates the number of terms that are found in the particular "bucket" for a group of databases. From the histogram a similarity score between two databases is derived, and repeated to determine the similarity score between the first database and each of the other databases of databases 120. Each of the databases of databases 120 are ranked as to their similarity to the first database, based on similarity scores. The similarity determination and ranking is repeated for each database of databases 120.

Term similarity program 400 performs similar to database similarity program 300; however, term similarity program 400 determines the similarity scores of databases to a set of user-selected search terms, and ranks the similarity of the databases to the search terms based on their similarity scores. The terms of all databases within a database environment are determined initially and made available for selection by a user. Term similarity program 400 identifies terms found in both the search terms and a selected database of databases 120, as "common terms". Term similarity program 400 determines the particular number of databases out of the total number of databases within databases 120, in which each common term is found. The particular number of databases, which can number from one database to "n" databases, corresponds to a group of databases. Term similarity program 400 may represent the number of common terms found in each group of databases as a graph or histogram, where the database groupings range from one database to all databases in the database environment. For example the x-axis of a histogram for databases 120, which has "n" databases, has a "bucket" for terms corresponding to each group of databases that include: a bucket for the number of terms found only in one database, a bucket for the number of terms found in only 2 databases, a bucket for the number of terms found in only 3 databases, . . . , and a bucket for the number of terms found in "n" databases. The y-axis of the histogram indicates the number of terms that are found in the particular "bucket" for a group of databases. From the histogram a similarity score between two databases is derived, and repeated to determine the similarity score between the first database and each of the other databases of databases 120. Each of the databases of databases 120 are ranked as to their similarity to the first database, based on similarity scores. The similarity determination and ranking is repeated for each database of databases 120.

Figure 2:
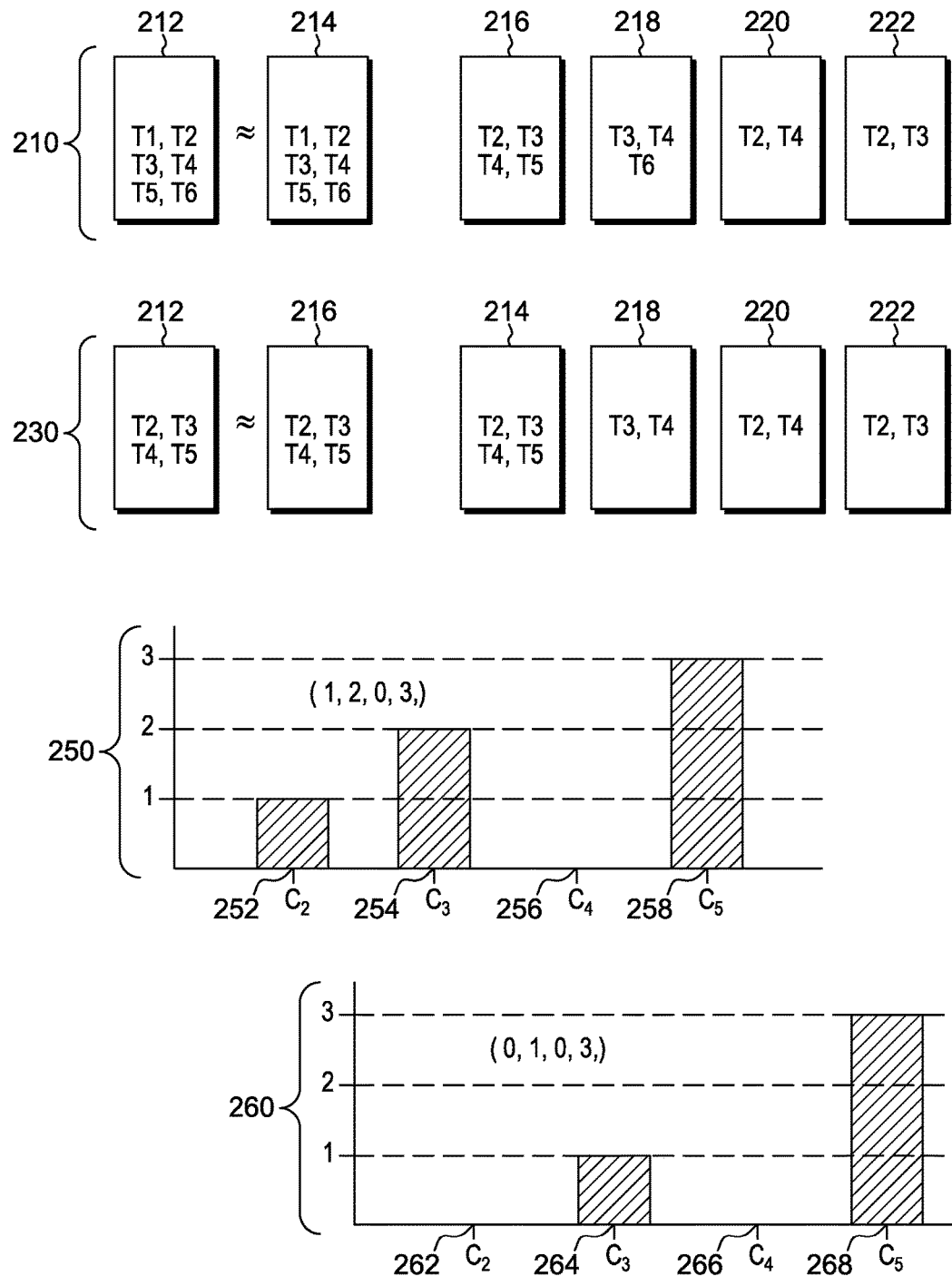
FIG. 2 is a block diagram depicting terms found in databases, and histograms associated with common terms of the databases within the distributed database environment of FIG. 1, in accordance with an embodiment of the present invention.

FIG. 2 is a block diagram depicting exemplary databases, terms within databases, and histograms indicating a frequency of terms in a number of databases, in accordance with an embodiment of the present invention. FIG. 2 includes database similarity 210, database similarity 230, histogram 250, and histogram 260. Database similarity 210 includes an exemplary set of databases; databases 212, 214, 216, 218, 220, and 222. A symbol (≈), indicating a similarity determination between databases 212 and 214 is depicted. Each database also depicts a set of terms found in the respective database, and in common with databases 212 and 214. Database similarity 230 includes exemplary databases 212, 216, 214, 218, 220, and 222; however, database similarity 230 depicts a symbol between databases 212 and 216 indicating a similarity determination between database 212 and database 216.

Embodiments of the present invention use "terms", which include metadata found in the databases being considered for similarity. The terms are applied to an adapted term frequency-inverse document frequency (tf-idf) algorithm, used to generate a value or "score", and determine an amount, level, or degree of similarity. The adapted tf-idf algorithm ignores term frequency and relies on inverse database frequency for similarity determination. For example, database 212 and database 214 are depicted with terms found in both databases, and to determine a similarity score between databases 212 and 214, the number of databases within distributed database environment 100 in which each term, found in databases 212 and 214, are also found, is used.

After a similarity score is determined between a database, such as database 212, and each of the other databases within distributed database environment 100, such as databases 214, 216, 218, 220, and 222, the databases are ranked based on similarity scores. Database similarity 210 depicts a similarity determination between databases 212 and 214, in which the common terms of databases 212 and 214 are determined and represented by T1, T2, T3, T4, T5, and T6. In one embodiment of the present invention, determination of the similarity between databases includes, the use of terms, each term including the metadata triplet combination of: a table name of a table within the database, a column name of a column within the table, and a column type of the column name.

For example, database 212 may have a table named "CustomerList", which includes a column within the table named "CustomerAccountNmbr", which has a column type of "integer". This triplet, CustomerList-CustomerAccountNmbr-integer, may be represented as "T1", and term triplets constructed from different table names, column names, and column types may be represented as T2, T3, T4, T5, and T6, for exemplary purposes. If two databases have a term in common, then both databases have a combination of table name, column name, and column type that match. In embodiments of the present invention, a hash of the term may be used to accurately compare and determine terms in common between databases or between selected search terms and databases. Databases 212 and 214 include terms T1, T2, T3, T4, T5 and T6, as common terms. Databases 216, 218, 220, and 222 are shown with the terms that each database has that are common with databases 212 and 214. Database 216 has terms T2, T3, T4, and T5 in common with databases 212 and 214. Database 218 has T3, T4, and T6 in common with databases 212 and 214. Database 220 has terms T2 and T4 in common with databases 212 and 214, and database 222 has T2 and T3 in common with databases 212 and 214. Similarity between databases 212 and 214 may be determined from a histogram that includes the count or frequency of terms common between the two databases, which are found in a particular number of databases within distributed database environment 100. The importance of a term "T" decreases with the number of databases that include the term T, and the similarity of two databases sharing a term that only appears in those two databases, ranks higher than any number of terms shared between three or more databases.

In an exemplary embodiment of the present invention, database similarity 230 depicts a similarity determination between databases 212 and 216 and includes the other databases in distributed database environment 100; databases 214, 218, 220, and 222. Databases 212 and 216 have a set of terms in common, which include T2, T3, T4, and T5, and are a different set of terms than those found in common between databases 212 and 214. Of the terms in common between database 212 and 216, database 214 shares terms T2, T3, T4, and T5. Similarly, database 218 shares terms T3, T4, and T6, database 220 shares terms T2 and T4, and database 222 shares terms T2 and T3 with the set of common terms between databases 212 and 216.

Histogram 250 depicts the count of common terms between databases 212 and 214, and aligns a number of terms with a particular number of databases in which the terms are found. Histogram 250 includes term count 252, 254, 256, and 258. Term count 252 represents the "bucket" of the number of terms common to databases 212 and 214 that are found in only two databases (databases 212 and 214). Term count 254 represents the bucket of the count of terms common to databases 212 and 214 that are found in only three databases. Term count 256 depicts the bucket of the count of terms common to databases 212 and 214 that are found in only 4 databases, and term count 258 depicts the bucket of the count of terms common to databases 212 and 214 that are found in 5 databases. Histogram 250 thus includes one term, T1, which is common between databases 212 and 214; two terms T5 and T6, shared by three databases; databases 212, 214, and 216, and databases 212, 214, and 218, respectively. Histogram 250 has zero terms shared by four databases but includes three terms shared by five databases. Term T2, is shared by databases 212, 214, 216, 220, and 222. Term T3 is shared by databases 212, 214, 216, 218, and 222. Term T4 is shared by databases 212, 214, 216, 218, and 220.

Histogram 260 depicts an exemplary number of common terms between databases 212 and 216 that occur in two, three, four or five databases, corresponding to term counts 262, 264, 266, and 268 respectively. Term count 262 indicates that there are zero common terms for the bucket corresponding to terms found in only two databases, and term count 264 indicates that there is one common term, T5, for the bucket corresponding to terms found in only three databases. Term count 266 indicates zero common terms for the bucket corresponding to terms found in only four databases, and term count 268 indicates that there are three terms for the bucket corresponding to terms found in only five databases. Term T2 is common to databases 212, 216, 214, 220, and 222. Term T3 is common to databases 212, 216, 214, 218, and 222, and term T4 is common to databases 212, 216, 214, 218, and 220, whereas term T5 is common to databases 212, 214, and 216.

Figure 3:
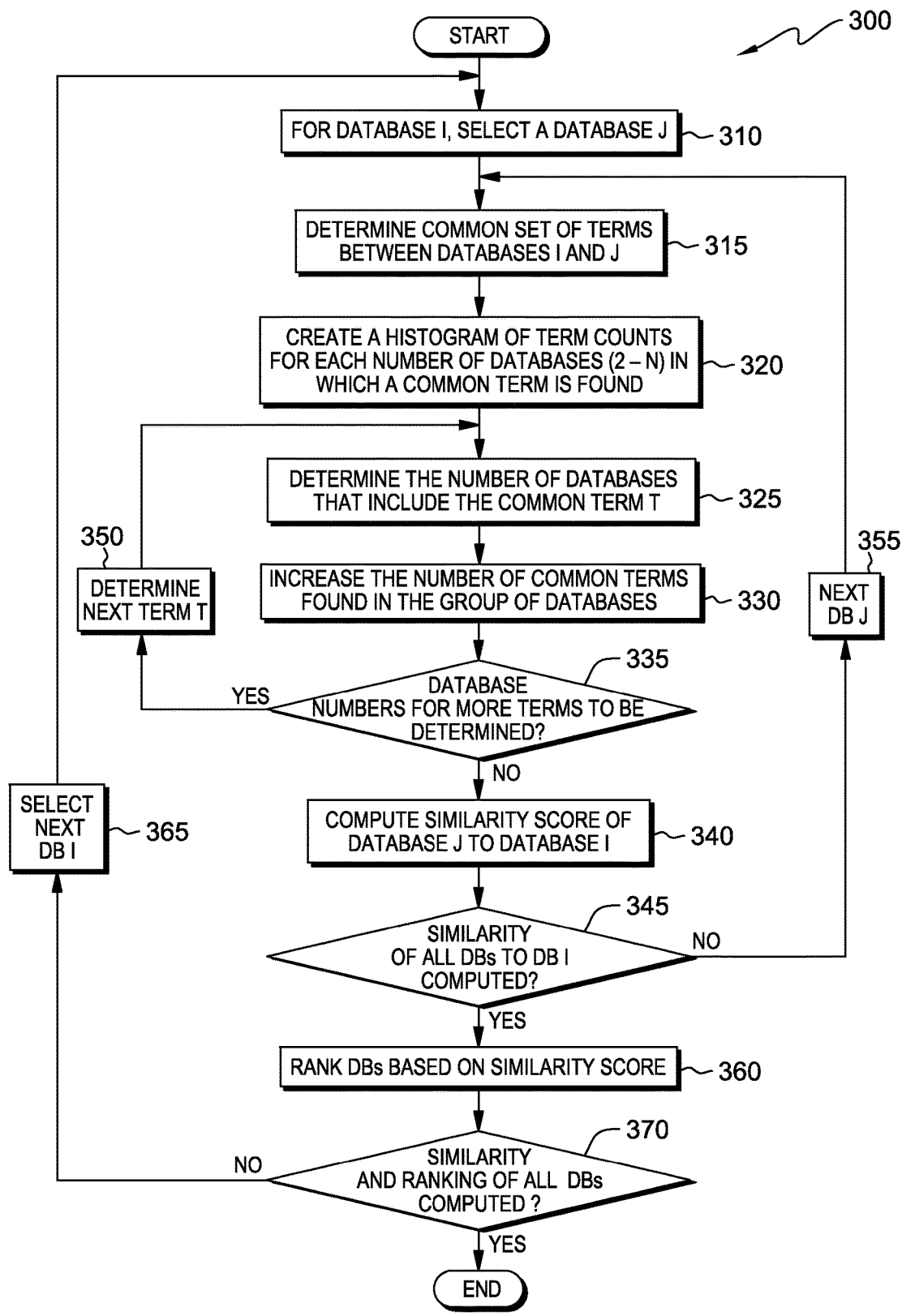
FIG. 3 illustrates operational steps of a database similarity program within the distributed database environment of FIG. 1, in accordance with an embodiment of the present invention.

FIG. 3 illustrates operational steps of a database similarity program within the distributed database environment of FIG. 1, in accordance with an embodiment of the present invention. For a group of databases which number from database 1 to database "n", database similarity program 300 determines the similarity score between a "database i" of the group of n databases, and each of the other databases of the group. Database similarity program 300 ranks the similarity of each of the other databases of the group of databases to database i, and repeats this for each database of the group of n databases. The use of a letter designation for a database, herein, indicates reference to one database of a group of databases of some number "n", and not to a particular database. Reference to "a next database i", "a next database j", or "a next term t", indicates sequencing to a different database or common term, respectively.

For database i of a group of n databases, database similarity program 300 selects a database j (step 310), where database i≠ database j. For example, distributed database environment 100 includes a group of six databases. For a database within the group of databases, such as a first database, database similarity program 300 selects a second database such that the first database and the second database are not the same database.

Database similarity program 300 determines a set of terms common to databases i and j (step 315). In one embodiment of the present invention, a database term includes the database metadata triplet of a table name, a table column name, and a table column type, within the database. In another embodiment, a database term may include the partial matching of database metadata elements of the term. Database similarity program 300 analyzes the terms within each of database i and database j and determines the terms that are common to both databases. For example, (referring to FIG. 2), database 212 is analyzed and the terms within database 212 are determined. Similarly, database 214 is analyzed and the terms within database 214 are determined. Database similarity program 300 determines the terms that are common to both databases 212 and 214, which are represented, for example, as T1, T2, T3, T4, T5, and T6. In an alternative example, partial matching of terms may be considered in determining the similarity of databases, such as matching a database table name and table column name, but not matching the table column type.

Having determined the common terms between database i and database j, database similarity program 300 determine the quantity or count of common terms found in a number of databases (2-n), in which a common term is found (step 320). The quantity of common terms found in a number of databases may be represented by a histogram. The histogram's vertical axis depicts the number of terms for a specific number of databases, and the horizontal axis depicts the buckets corresponding to groups of databases, each group numbering from 2 to n, for n databases.

For example, histogram 250 (FIG. 2), shows term count 252 as the bucket reflecting the quantity of terms found in only two databases (C2), whereas term count 258 is the bucket reflecting the quantity of terms found only in five databases (C5).

Having computed the number of databases in which the common term "t" is included, database similarity program 300 determines the number of databases that include the common term t (step 325). Database similarity program 300 analyzes all the databases of distributed database environment 100 to determine the number of databases that include the term t. For example, database similarity program 300 analyzes databases 212, 214, 216, 218, 220, and 222, determining if a term, such as term T2, is included in each database. If the term is found to be included in databases, such as databases 212, 214, 216, 220, and 222 for term T2, database similarity program 300 computes a count of the databases in which the term is found; in this case, five. It should be pointed out that the number of databases in which common terms are found may range from two to the total number of databases considered. Since the terms are at least common to two databases, the database count for n databases may range from 2 to n.

Having determined the number of common terms and the number of databases in which the term t is included, database similarity program 300 increases the number of common terms found in the group of databases (step 330). For a given term, the number of databases in which the term is found is determined and the corresponding bucket for the group of databases, which is the number of databases in which the term is found, is increased. For example, the databases including the term T5 are determined to be databases 212, 214, and 216. The number of these databases corresponds to term count 254 (C3) of histogram 250. The term count, corresponding to terms found only in three databases, is incremented by one.

Database similarity program 300 determines if database numbers for more terms are to be determined (decision step 335). Having determined that there are more terms for which a count of databases are to be determined (step 335, "YES" branch), database similarity program 300 determines the next term t (step 350), and proceeds to step 325 to compute the number of databases d, which include the next term t of the common terms between databases i and j. Database similarity program 300 selects a next term and computes the number of databases in which the next term is found and updates the number of common terms for the groups of databases, such as the buckets of the histogram, appropriately.

If database similarity program 300 determines no more terms need database counts to be performed, (step 335, "NO" branch), database similarity program 300 computes a similarity score of database j to database i (step 340). To obtain a numerical measure of similarity from a frequency histogram, preserving order, a value for "$\alpha$" is chosen where $\alpha > 0$, e.g. $\alpha = 1$. The similarity of database i to database j can be defined as a function of the number of common terms found in each group of databases, which if represented as a tuple of a histogram for a database i, ($H_i$), would include the tuple ($h_2$, $h_3$, ..., $h_n$). Each element of the tuple, $h_k$, is the quantity of common terms between databases i and j that are found only in k databases. In one embodiment of the present invention, a numerical similarity score is obtained by applying equation (1).

$$f(h_1, h_2, \ldots, h_n) = \sum_{k=1}^{n} \frac{h_k}{\alpha + h_k} \prod_{p=1}^{k-1} \frac{\alpha}{(\alpha + h_p)(\alpha + h_p + 1)} \quad (1)$$

In embodiments of the present invention, techniques of obtaining a numerical measure of similarity from the frequency histograms may be used, such as using weighting factors for each element of the tuple, with the first element corresponding to the fewest number of databases in which common terms are found having a significantly higher weighting than the next element of the tuple having the next fewest number of databases, etc.

Having determined the similarity score of database j to database i, database similarity program 300 determines if the similarity of all databases to database i has been computed (decision step 345). Determining that the similarity of all databases to database i has not been computed, (step 345, "NO" branch), database similarity program 300 selects a next database j (step 355), and proceeds to step 315 to determine a common set of terms between database i and next database j. For example, having determined the similarity between databases 212 and 214, database similarity program 300 selects another database, for example, database 216, and proceeds to step 315 to determine a common set of terms between databases 212 and 216 and proceeds accordingly.

Determining that the similarity of all databases to database i has been computed (step 345, "YES" branch), database similarity program 300 ranks the databases based on the similarity scores (step 360). In determining similarity between databases, embodiments of the present invention consider a single term common to two databases, which are found only in the two databases to be a higher similarity score than any number of terms common to two databases which are found in three or more databases. For example, referring to FIG. 2, histogram 250 depicting the similarity between databases 212 and 214 can be represented as (1,2,0,3). The similarity between databases 212 and 216 can be represented as (0,1,0,3), and suppose the similarity between 212 and another database (not shown) can be represented as (0, 1,1,1). The similarity ranking of databases from most similar to least similar would be: (1,2,0,3)>(0,1, 1,1)>(0,1,0,3). The tuple (1,2,0,3) from the histogram of similarity between databases 212 and 214 corresponds to one term found in only two databases, two terms found in only three databases, zero terms found in only four databases and three terms found in only five databases. The similarity histogram tuple (0,1,1,1) is ranked higher in similarity than the histogram tuple (0,1,0,3) since both have zero terms found in only two databases, one term found in only three databases, but the former has one term found in only 4 databases, whereas the later has zero terms found in only four databases.

Having ranked all databases based on a similarity score to database i, database similarity program 300 determines if the similarity and ranking of all databases to each other have been computed (decision step 370), and determining that similarity and ranking of all databases to each other has not been computed, database similarity program 300 selects a "next" database i and proceeds to step 310 to select a database j. For example, when the similarity of database 212 and each of the remaining databases in distributed database environment 100 has been determined, database similarity program 300 selects a next database i, such as database 214, and proceeds to step 310 to select a database j, such as database 216, and proceed accordingly until the similarity is determined between database 214 and the other databases in distributed database environment 100, (i.e. all the other databases except database 214).

Determining that the similarity and ranking of all databases to each other have been computed (step 370, "YES" branch), database similarity program 300 ends.

Figure 4:
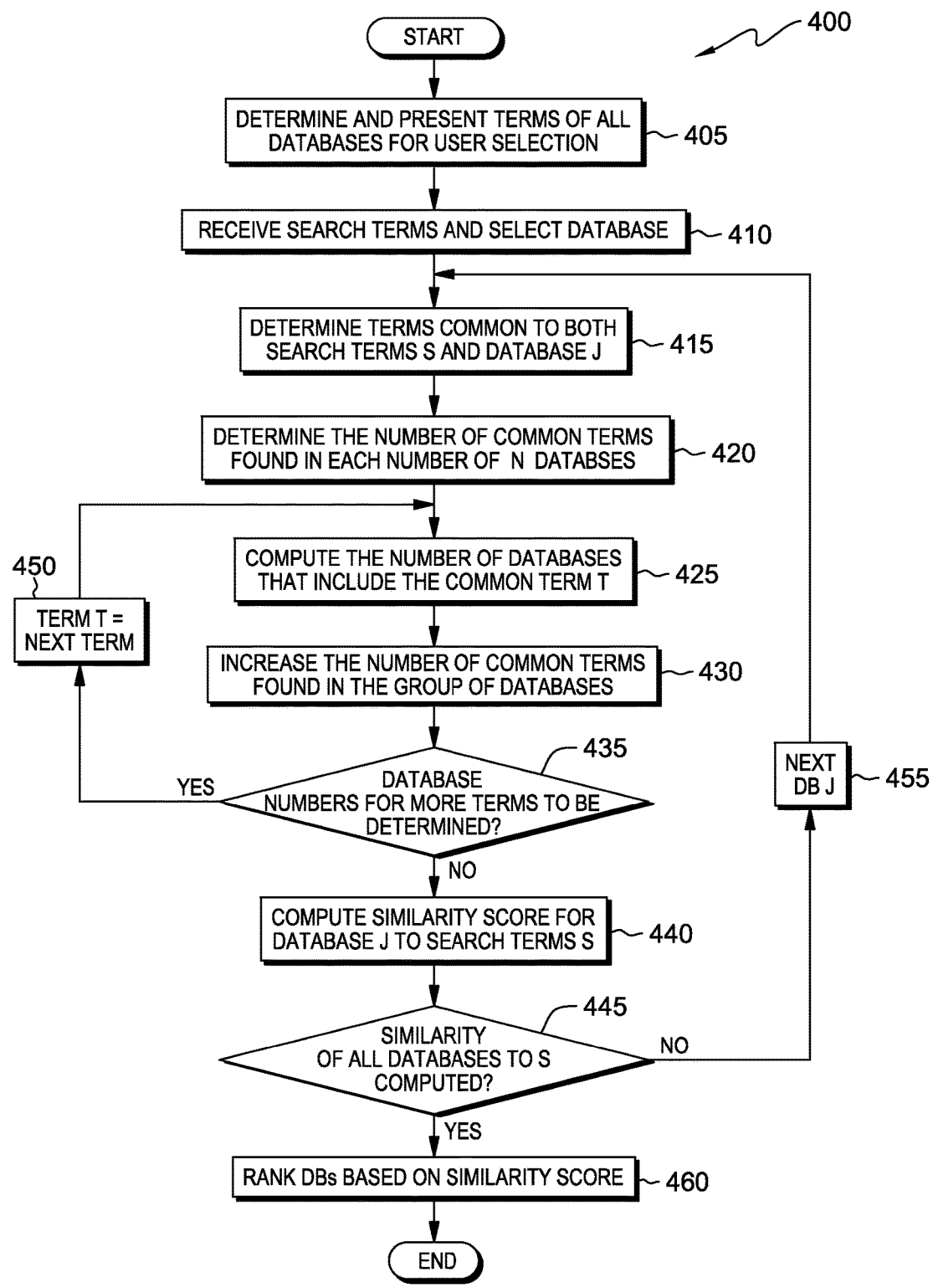
FIG. 4 depicts the operational steps of a term similarity program within the distributed database environment of FIG. 1, in accordance with and embodiment of the present invention.

FIG. 4 depicts the operational steps of a term similarity program within the distributed database environment of FIG. 1, in accordance with and embodiment of the present invention. Term similarity program 400 shares operational steps of database similarity program 300; however, term similarity program 400 determines similarity of databases to a user-selected set of search terms.

Term similarity program 400 determines and presents terms of all databases for user selection (step 405). Term similarity program 400 accesses all databases in the group of n databases and determines all the terms found among all n databases, where a term is the triplet of table name, column name, and column type. The terms are presented by term similarity program 400 to a user of computing device 110 (FIG. 1) for selection. Each selected term s, is aggregated to form a set of terms S, (s∈S), to which the similarity of each of the n databases is to be determined.

Term similarity program 400 receives the search terms and selects a database (step 410). Search terms S include database terms selected by a user from a listing of all terms within the n databases. Database j, selected by term similarity program 400 is one of n databases in distributed database environment 100. In one embodiment of the present invention, term similarity selects database j randomly, in other embodiments database j may be selected alphabetically, based on database size, based on date of last update, or chosen by a user.

Term similarity program 400 determines terms common to both search terms S and database j (step 415). The terms associated with search terms S and the terms associated with database j are analyzed and the terms common to both the search terms S and database j are identified and used to determine a measure of similarity. For example, search terms S may include the terms: T1, T2, T4, and T6. Database j may include the terms T2, T3, T4, T5, and T6. Search terms S and database j both have terms T2, T4 and T6 in common.

Having determined the set of common terms, term similarity program 400 determines the number of common terms found in each number of n databases (step 420). The number of common terms found in a number of databases may be represented by a histogram. The histogram's vertical axis depicts the count of terms for a specific number of databases, and the horizontal axis depicts the bucket corresponding to the number of databases, from 1 to n, for n databases, similar to the discussion above with respect to FIG. 3.

Term similarity program 400 computes the number of databases that include the common term t (step 425). For example, the terms common to search term set S and database j are T2, T4, and T6. Database similarity 210 (FIG. 2), includes six databases, each database includes specific terms. Term T2 is found in databases 212, 214, 216, 220, and 222, or five of the six databases, Term T4 is found in databases 212, 214, 216, 218, and 220, or five of the six databases. Term T6 is found in databases 212, 214, and 218, or three of the six databases. Term similarity program 400 determines the number of databases (1 to n) in which each of the terms common to search terms S and database j are found.

Having computed the database count in which the term t was found, term similarity program 400 increases the number of common terms found in the group of databases (step 430). For a given term, the number of databases in which the term is found, is determined, and the corresponding bucked for the group of databases, which is the number of databases in which the term is found, is increased. Term similarity program 400 determines the number of databases in which the term t is found and increases the corresponding number of common terms, such as increasing the bucket on the histogram corresponding to the number of databases in which the term is found. For example, histogram 260 depicts term count 262, corresponding to a term found in only two databases, term count 264, corresponding to a term found in only three databases, term count 266, corresponding to a term found in only four databases, and term count 268, corresponding a term found only in five databases. In our previous example, terms T2 and T4 are both found in five databases. Term similarity program would increment the term count 268, associated with five databases, by one for each of term T2 and T4. Similarly, term similarity program 400 would increment term count 264, corresponding to terms found in only three databases, by one for term T6.

Term similarity program 400 determines if database numbers for more terms need to be determined (decision step 435). Determining that there are database numbers for more terms to be performed (step 435, "YES" branch), term similarity program 400 indexes to the next term t (step 450) and determines the number of databases that include the next common term t (step 425). Term similarity program proceeds as discussed previously.

Determining that no database numbers for additional terms need to be determined (step 435, "NO" branch), term similarity program 400 computes a similarity score of database j to the search terms S (step 440). As previously stated with respect to FIG. 3, in determining similarity, embodiments of the present invention consider a single term common to the set of search terms and one database, which is found only in the one database, to be a higher similarity score than any number of common terms found in two or more databases. For example, a histogram of similarity between search terms S and database j, having three common terms, may be represented as (1,0,2), corresponding to one common term found in only one database, zero terms found in only two databases and two common terms found in only three databases. The database j corresponding to the histogram tuple representation of (1, 0, 2) is considered more similar to the search terms than a database with five terms in common with search terms S, and a histogram tuple representation of (0, 3, 2). A numerical measure of similarity from a frequency histogram may be calculated as discussed with respect to FIG. 3, to obtain a similarity score.

Having computed the similarity of database j to search terms S, term similarity program 400 determines if the similarity of all databases to search terms S are computed (decision step 445). Determining that the similarity of all databases to search terms S have not been computed (step 445, "NO" branch), term similarity program 400 selects a next database j (step 455), for which a similarity to search terms S has not been computed. Term similarity program returns to step 415 to determine the terms common to both search terms S and database j and proceeds as previously discussed.

Having determined that the similarity of all databases to search terms S have been computed (step 445, "YES" branch), term similarity program 400 ranks the databases based on the similarity scores (step 460). In embodiments of the present invention, term similarity program 400 may save and/or display the similarity rankings of the databases in distributed database environment 100 and ends.

Figure 5:
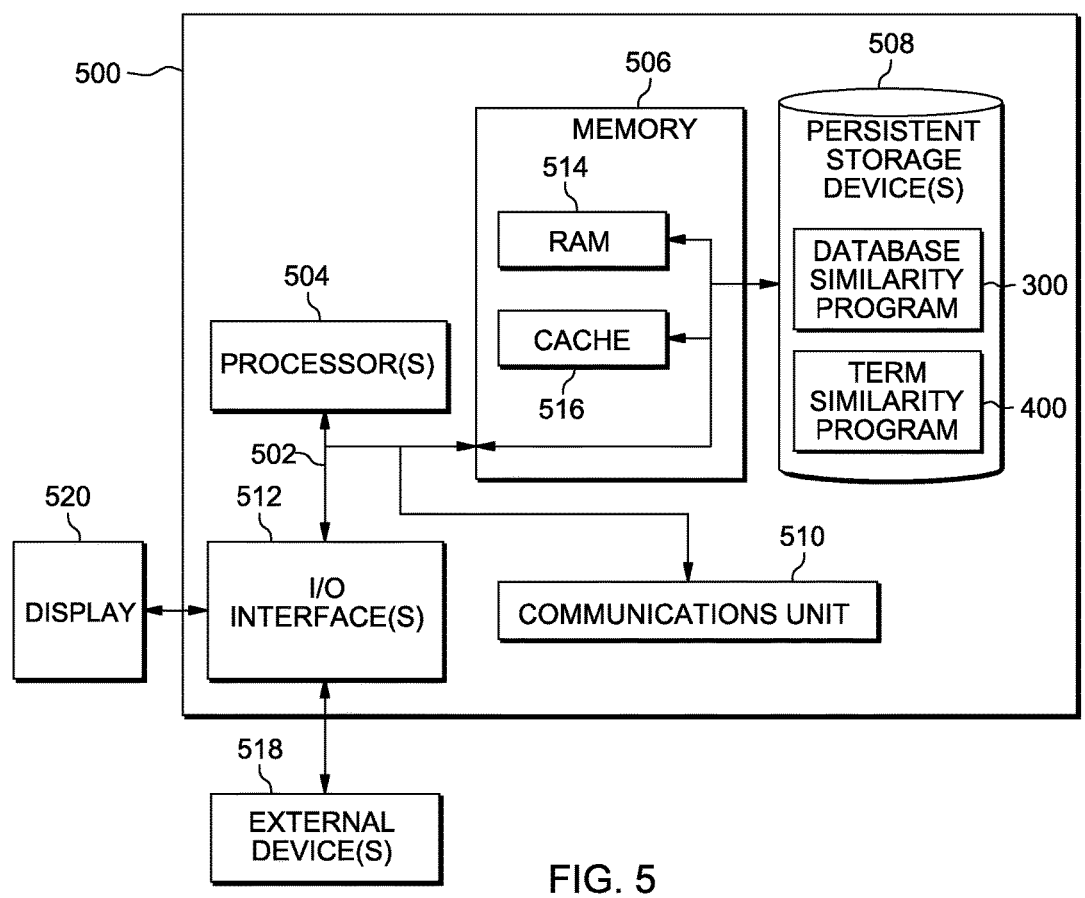
FIG. 5 depicts a block diagram of components of a computing device capable of executing the database similarity program and the term similarity program, in accordance with an embodiment of the present invention.

FIG. 5 depicts a block diagram of components of a computing device 500, capable of executing database similarity program 300 and term similarity program 400, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, persistent storage 508, communications unit 510, and input/output (I/O) interface(s)

512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Database similarity program 300 and term similarity program 400 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of databases 120 and computing device 500 of distributed database environment 100. In these examples, communications unit 510 includes one or more network interface cards. Communications unit 510 may provide communications through the use of either or both physical and wireless communications links. Database similarity program 300 and term similarity program 400 may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., database similarity program 300 and term similarity program 400, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for determining a similarity of databases, the computer program product comprising:
   a computer-readable storage device having computer readable program code embodied therewith, the computer readable program code comprising:
   (a) computer readable program code configured to select a first database and a second database from a plurality of databases that includes at least three databases;
   (b) computer readable program code configured to identify one or more terms found in the first database and found in the second database of the plurality of databases, wherein each term of the one or more terms is comprised of metadata of a structure of a database of the plurality of databases, and wherein terms of the one or more terms found in both the first database and the second database are one or more common terms;
   (c) computer readable program code configured to determine for a common term of the one or more common terms, a quantity of databases of the plurality of databases, in which a common term of the one or more common terms is found, wherein the quantity of databases of the plurality of databases in which the common term of the one or more common terms is found, constitutes a group, and wherein a range of groups includes each quantity of databases from a group of two databases to a group of a quantity of the plurality of databases; and
   (d) computer readable program code configured to determine a similarity score between the first database and the second database of the plurality of databases based on a tuple formed from the quantity of the one or more common terms found in each group of databases of the plurality of databases.

2. The computer program product of claim 1, further comprising:
   computer readable program code configured to perform steps (a) through (d) for each pairing of the first database with each database of the plurality of databases other than the second database; and
   computer readable program code configured to rank the similarity scores for each pairing of the first database with each database of the plurality of databases.

3. The computer program product of claim 1, further comprising:
  computer readable program code configured to perform steps (a) through (d) on all pairings of the plurality of databases, other than pairings with the first database; and
  computer readable program code configured to rank the similarity scores of pairings of the plurality of databases, other than pairings with the first database.

4. The computer program product of claim 1, wherein the metadata of the structure of the first database, comprising the one or more common terms includes at least one of a database table name, a database table column name, and a database table column type.

5. The computer program product of claim 1, wherein determining the one or more common terms includes determining a partial match of the one or more common terms between the first database and the second database.

6. The computer program product of claim 1, wherein at least one term of the one or more terms is a hash derived from the metadata of the first database of the plurality of databases.

7. A computer system for determining a similarity of databases, the computer system comprising:
  one or more computer processors;
  one or more computer readable storage devices; and
  program instructions stored on the computer readable storage media for execution by at least one of the one or more processors, the program instructions comprising:
  (a) program instructions to select a first database and a second database from a plurality of databases that includes at least three databases;
  (b) program instructions to identify one or more terms found in the first database and found in the second database, wherein each term of the one or more terms is comprised of metadata of a structure of the first database of the plurality of databases, and wherein terms of the one or more terms found in both the first database and the second database are one or more common terms;
  (c) program instructions to determine for a common term of the one or more common terms, a quantity of databases of the plurality of databases, in which a common term of the one or more common terms is found, wherein the quantity of databases of the plurality of databases in which the common term of the one or more common terms is found, constitutes a group, and wherein a range of groups includes each quantity of databases from a group of two databases to a group of a quantity of the plurality of databases; and
  (d) program instructions to determine a similarity score between the first database and the second database of the plurality of databases based on a tuple formed from the quantity of the one or more common terms found in each group of databases of the plurality of databases.

8. The computer system of claim 7, further comprising:
  program instructions to perform steps (a) through (d) for each pairing of the first database with each database of the plurality of databases other than the second database; and
  program instructions to rank the similarity scores for each pairing of the first database with each database of the plurality of databases, other than the second database.

9. The computer system of claim 7, further comprising:
  program instructions to perform steps (a) through (d) on all pairings of databases of the plurality of databases, other than pairings with the first database; and
  program instructions to rank the similarity scores of the pairings of the plurality of databases, other than pairings with the first database.

10. The computer system of claim 7, wherein the metadata of the structure of the first database, comprising each of the one or more common terms includes at least one of a database table name, a database table column name, and a database table column type.

11. The computer system of claim 7, wherein determining the one or more common terms includes determining a partial match of the one or more terms between the first database and the second database.

12. The computer system of claim 7, further comprising:
  program instructions to create a graph based on the quantity of the one or more common terms found in each group of databases of a plurality of groups of databases wherein the graph is associated with a similarity of the second database to the first database.

13. A computer program product for determining a similarity of databases to search criteria, the computer program product comprising:
  a computer-readable storage device having computer readable program code embodied therewith, the computer readable program code comprising:
  (a) computer readable program code configured to receive search criteria, wherein the search criteria includes one or more terms;
  (b) computer readable program code configured to determine the one or more terms found in both the search criteria and a first database of a plurality of databases, wherein the one or more terms found in both the search criteria and a first database are one or more common terms;
  (c) computer readable program code configured to determine for a common term of the one or more common terms, a quantity of the one or more common terms found in each of a plurality of groups of databases of the plurality of databases, wherein a group of databases of the plurality of groups of databases includes a quantity of databases in which a common term of the one or more common terms is found, and wherein a range of groups includes each quantity of databases from a group of two databases to a group of a quantity of the plurality of databases; and
  (d) computer readable program code configured to determine a similarity score of the first database of the plurality of databases based a tuple formed from on the quantity of the one or more common terms found in each group of databases of the plurality of databases, wherein the similarity of the first database to the search criteria is based on the similarity score.

14. The computer program product of claim 13, wherein determining a similarity score of the first database, further comprises:
  computer readable program code configured to perform steps (a) through (d) for each pairing of the search criteria and each database of the plurality of databases other than the first database; and
  computer readable program code configured to rank the similarity of each database of the plurality of databases to the search criteria, based on the similarity score of each database of the plurality of databases.

15. The computer program product claim 13, wherein the one or more terms of the search criteria include metadata of the structure of the first database of the plurality of databases, the metadata having at least one of a database table name, a database table column name, and a database table column type.

16. The computer program product of claim 13, wherein determining one or more common terms includes determining a partial match of the search criteria terms and terms of the first database.

17. A computer system for determining a similarity of databases to search criteria, the method comprising:
   one or more computer processors;
   one or more computer readable storage devices; and
   program instructions stored on the computer readable storage media for execution by at least one of the one or more processors, the program instructions comprising:
   (a) computer readable program code configured to receive search criteria, wherein the search criteria includes one or more terms;
   (b) computer readable program code configured to determine the one or more terms found in both the search criteria and a first database of a plurality of databases, wherein the one or more terms found in both the search criteria and a first database are one or more common terms;
   (c) computer readable program code configured to determine for a common term of the one or more common terms, a quantity of the one or more common terms found in each of a plurality of groups of databases of the plurality of databases, wherein a group of databases of the plurality of groups of databases includes a quantity of databases in which a common term of the one or more common terms is found, and wherein a range of groups includes each quantity of databases from a group of two databases to a group of a quantity of the plurality of databases; and
   (d) computer readable program code configured to determine a similarity score of the first database of the plurality of databases based a tuple formed from on the quantity of the one or more common terms found in each group of databases of the plurality of databases, wherein the similarity of the first database to the search criteria is based on the similarity score.

18. The computer system of claim method of claim 17, further comprises:
   program instructions to perform steps (a) through (d) for each pairing of the search criteria and each database of the plurality of databases other than the first database; and
   program instructions to rank the similarity of each database of the plurality of databases to the search criteria, based on the similarity score of each database of the plurality of databases.

19. The computer system of claim 17, wherein the metadata of the structure of the first of each of the one or more common terms includes at least one of a database table name, a database table column name, and a database table column type.

20. The computer system of claim 17, wherein determining the one or more common terms includes determining a partial match of the of the search criteria terms and terms of the first database.

* * * * *